United States Patent

Nakamura et al.

[11] Patent Number: 5,533,884
[45] Date of Patent: Jul. 9, 1996

[54] SPEED CONTROL UNIT FOR AN INJECTION MOLDING MACHINE

[75] Inventors: Nobuyuki Nakamura; Tsuyoshi Arai, both of Nagano, Japan

[73] Assignee: Nissei Plastic Industrial Co., Ltd., Nagano-Ken, Japan

[21] Appl. No.: 317,352

[22] Filed: Oct. 4, 1994

[51] Int. Cl.$^6$ ................................................. B29C 45/77
[52] U.S. Cl. .......................... 425/145; 264/40.5; 425/149
[58] Field of Search ................................. 425/145, 149; 264/40.1, 40.5, 328.1

[56] References Cited

U.S. PATENT DOCUMENTS 5,425,906 6/1995 Hashimoto ........................... 264/40.1

FOREIGN PATENT DOCUMENTS 6-143378 5/1994 Japan .

Primary Examiner—Tim Heitbrink

[57] ABSTRACT

A speed control unit devised for feedback-controlling the speed of actuator 2 (injection cylinder 2i) in response to the deviation of speed measurement Vd from command value Vc of speed, includes a pressure sensing device 3 to detect pressure measurement Pd at actuator 2, differentiation circuitry 4 to differentiate pressure measurement Pd from the pressure sensing device 3, a gain adjusting device to provide correction value Av through gain adjustment of differentiated value Dv from differentiation circuitry 4, and a correcting device 6 to correct command value Vc of speed according to correction value Av from the gain adjusting device 5, whereby in addition to ordinary feedback control to correct command value Vc of speed, following speed measurement Vd, command value Vc of speed is corrected in response to the fluctuations of load pressure, with stabilized, high accuracy of speed control made feasible which is assured freedom from being affected by the fluctuations of load pressure, and so forth.

6 Claims, 2 Drawing Sheets

SPEED CONTROL UNIT FOR AN INJECTION MOLDING MACHINE

FIELD OF THE INVENTION

The present invention relates to a speed control unit which is provided for injection molding machines with a view to controlling the running speed of an actuator such as an injection cylinder, and so forth serving to move back and forth the screw.

DESCRIPTION OF THE RELEVANT ART

Generally, injection molding machines go primarily each with either the feedback or the open loop control system applied as a control system for their actuators such as injection cylinders or the like. The former is characterized by not only a complex system configuration plus a higher cost but also a merit that higher accuracy of control is feasible, for both the running speed and the working pressure of an actuator are directly feedback-controlled, using a servo valve. Meanwhile, compared with the former, the latter is inferior over the accuracy of control but is meritorious in the aspect of a simpler system configuration and a lower cost, wherein the discharge flow of oil from and the discharge pressure thereof from a hydraulic pump are feedback-controlled, using a minor loop but the running speed and the working pressure of an actuator are not feedback-controlled.

The speed control unit used to apply a feedback control system for injection molding machines, is disclosed in Japanese Patent Laid-Open Publication No. 6 (1994) 143378 for example. The speed control unit disclosed in the above Patent Laid-Open Publication is of such a constitution wherein a speed sensing means detects the running speed (running speed measurement) of the injection cylinder and further a deviation sensing means detects the deviation of a speed measurement from a command value of speed. Meanwhile, this deviation is converted by a compensating circuit into a controlled variable (manipulated variable) and this controlled variable is fed to a servo valve for controlling the drive of an injection cylinder, whereby feedback control is effected so that the measurement of speed and the command value of speed may agree with each other.

The feedback control system of such a configuration as the above has so far been confronting with the problem that the following inconvenience would occur. Namely, the feedback control system serves with the command value of speed subject to a correction in a manner that the running speed and a setpoint of speed may coincide with one another but normally, the control system referred to above keeps a given time constant; therefore, where step control is implemented for injection under no load or fixed load, the measurement of speed follow the command value of speed in delay and then gradually gets stabilized.

On the other hand, in actual injection molding with molten plastic being injected into the cavity within a set of molds, filling it up, the load pressure fluctuates due to the mold structure, mold cooling conditions, etc., whereby the controlled variable fed to the servo valve also fluctuates. Normally, in the feedback control system, the command value of speed is corrected in response to the fluctuation which the load pressure incurs, and in addition, a given time constant is provided to said control system for stabilizing the performance. However, when the load pressure fluctuation goes beyond this time constant, the controlled variable for the servo valve fails to follow said fluctuation, with the accuracy of control declining as a result. In FIG. 2, the changes of speed measurement Vdo (injection speed) along with the progress of time are illustrated in a dotted line while the variations of pressure measurement Pd (load pressure) in line with the process of time is presented in a single dot broken line. As is clear from the figure, when pressure measurement Pd grows large abruptly starting from Xp point, the injection speed (speed measurement Vdo) falls also greatly, deviating from the setpoint of speed in response to the increase of this load pressure. It is noted here that decrease of load pressure concurs with the increase of injection speed.

SUMMARY OF THE INVENTION

An object of the present invention is to provide a speed control unit for injection molding machines, which allows stabilized, high precision speed control independent of the fluctuations of load pressure, whereby the quality of molded products may be improved.

To attain this object, the present invention devised such a speed control unit for feedback-controlling the speed of actuator 2 (injection cylinder 2i) in response to the deviation of speed measurement Vd from command value Vc of speed as comprises particularly, pressure sensing member 3 to detect pressure measurement Pd at actuator 2, differentiation circuitry 4 wherein pressure measurement Pd from pressure sensing member 3 is differentiated, gain adjusting member 5 to provide correction value Av through gain adjustment of pressure measurement differentiated value Dv from differentiation circuitry 4, and correcting member 6 to correct command value Vc of speed according to correction value Av from gain adjusting means 5, wherein gain adjusting member calculates correction value Av from the product (Kp×Dv) of differentiated value Dv and differentiation gain Kp. In this case, differentiation gain Kp can be calculated by multiplying differentiation gain Kpv obtained from setpoint Vs of speed via arithmetic operation with differentiation gain Kpp obtained from pressure measurement Pd through arithmetic operation. Meanwhile, correcting member 6 has a function to add correction value Av to command value Vc of speed.

With the speed control unit of the present invention, feedback control is effected in response to the deviation of speed measurement Vd from command value Vc of speed in a manner that the speed (injection speed) of actuator 2 may agree with setpoint Vs of speed. In the meanwhile, pressure measurement Pd at actuator 2 is detected by pressure sensing member 3, followed by being fed to differentiation circuitry 4 wherein pressure measurement Pd is then differentiated, with differentiated value Dv provided thereby. This differentiated value Dv is fed to gain adjusting member 5 wherein differentiated value Dv experiences gain adjustment. The result is that correction value Av is provided from gain adjusting member 5 and is subsequently fed to correcting member 6 wherein command value Vc of speed is corrected according to correction value Av.

Therefore, in addition to the ordinary feedback control wherein command value Vc of speed is corrected according to speed measurement Vd, command value Vc of speed is corrected in response to the fluctuations of load pressure.

Detailed Description of the Preferred Embodiments

Next, one of the preferred embodiments of the present invention is quoted and is described in detail with reference to the accompanying drawings.

Figure 1:
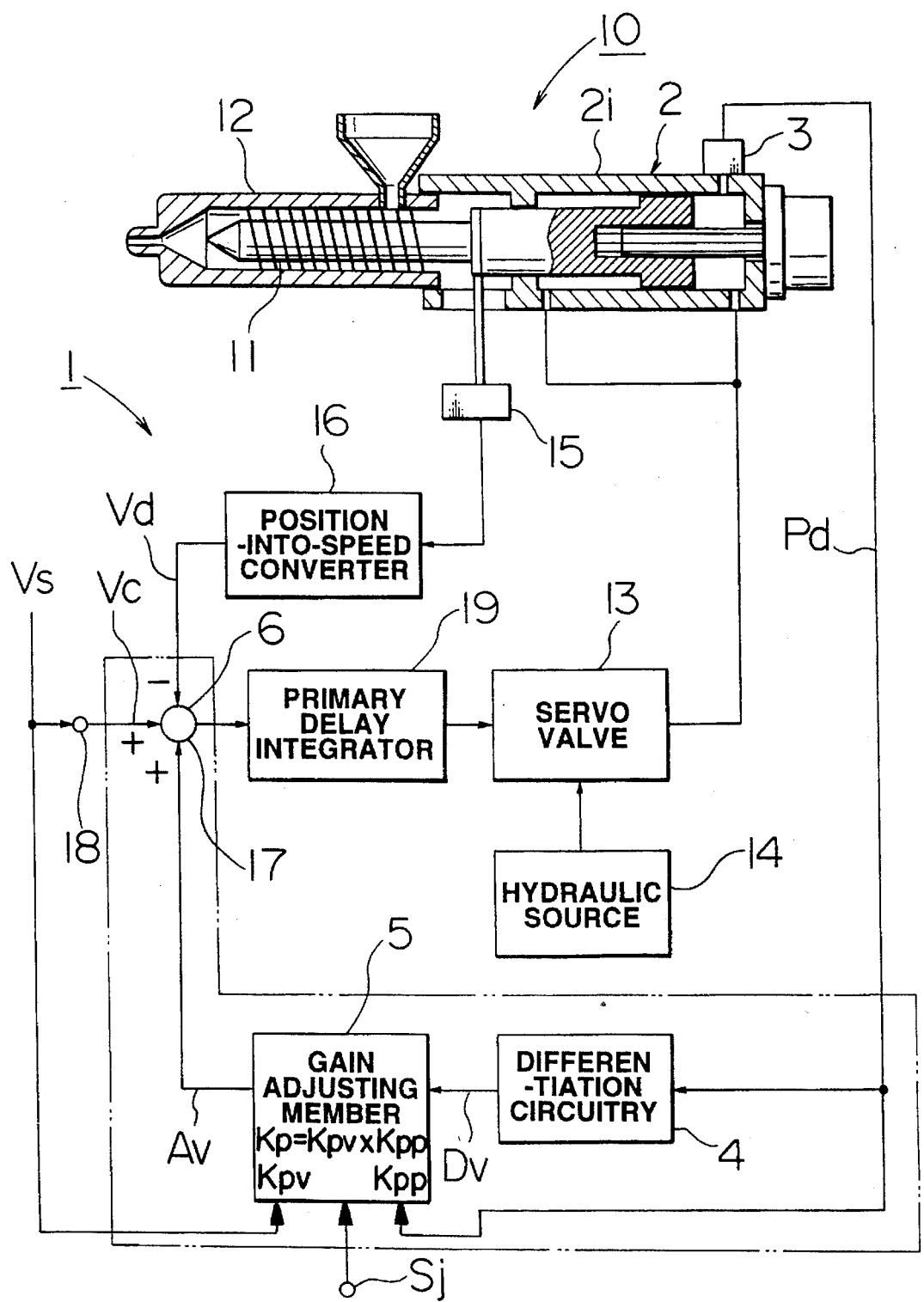
FIG. 1 is a block circuit diagram of the speed control unit to which the preset invention relates.

First, the constitution of the speed control unit for injection molding machines to which the present invention relates is described, referring to FIG. 1

With reference to FIG. 1, 10 refers to an injection unit of the injection molding machine, which injection unit includes injection cylinder 2i (actuator 2) to move back and forth screw 11 incorporated in barrel cylinder 12, which injection cylinder 2i is coupled to hydraulic source 14 via servo valve 13.

Meanwhile, 1 refers to the speed control unit of the present invention to control the injection speed of screw 11. Speed control unit 1 includes position sensor 15 to detect the forward speed (injection speed) of screw 11 through sensing the position to which the screw has reached in a given time, and position-into-speed converter 16 to convert the consequence of detection by position sensor 15 into a speed by way of differentiating said consequence, wherein the output of this position-into-speed converter 16 is connected to the input of deviation detecting member 17 which also serves as correcting member 6. 18 refers to an input from which setpoint Vs of speed is entered and which is connected to another input of deviation detecting member 17. Further, the output of deviation detecting member 17 is coupled to the input of control member 19 including a primary-delayed integrating function while the output of control member 19 is joined to servo valve 13.

On the other hand, to detect the load pressure (pressure measurement Pd) at injection cylinder 2i, pressure sensing member (pressure sensor) 3 is furnished. Pressure sensing member 3 is coupled to the input of differentiation circuitry 4 having a differentiating function while the output of differentiation circuitry 4 is connected to the input of gain adjusting member 5 with a gain adjusting function. It is noted here that to the input of gain adjusting member 5, pressure measurement Pd, setpoint Vs of speed and speed acceleration/deceleration simultaneity signal Sj are fed. The output of gain adjusting member 5 is connected to correcting member 6 (deviation detecting member 17).

Figure 2:
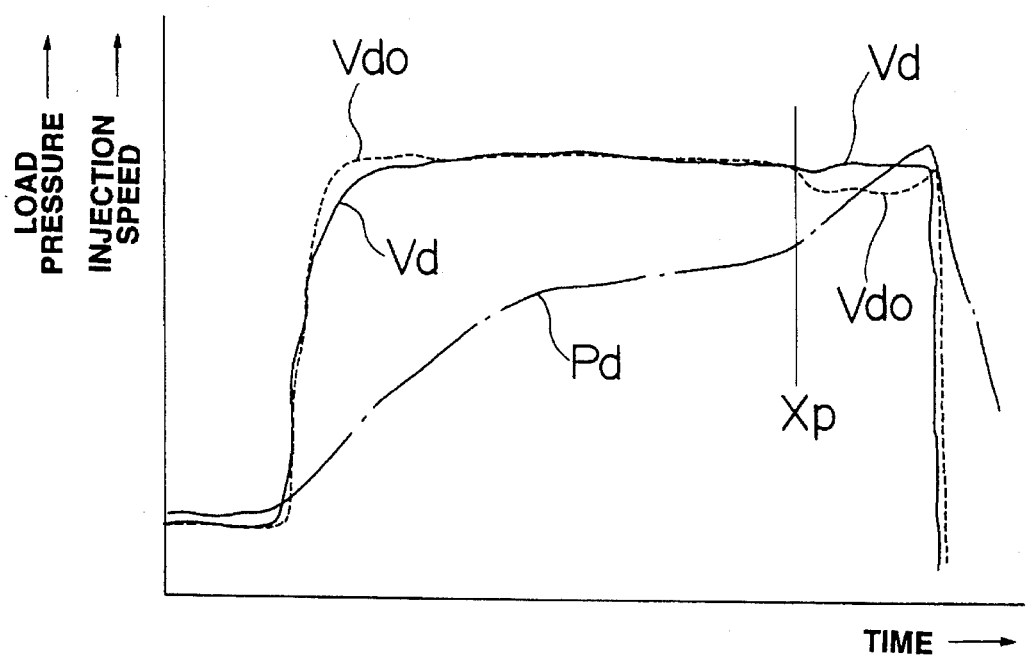
FIG. 2 is a graph illustrating the injection speed and load pressure characteristics which the injection molding machine using the speed control unit of the present invention exhibits in the progress of time during operation.

Next, with reference to FIGS. 1 and 2, how speed control unit 1 functions is described hereunder.

Speed control unit 1 is devised basically to effect feedback control in response to the deviation of speed measurement Vd from command value Vc of speed so that the injection speed may coincides with setpoint Vs of speed. Namely, in feedback control, not only command value Vc of speed based on setpoint Vs of speed which has been entered from input 18 but also speed measurement Vd from position-into-speed converter 16 are fed to deviation detecting member 17. From deviation detecting member 17, the deviation found in speed measurement Vd in reference to command value Vc of speed is obtained, which is fed to control member 19 which in turn provides servo valve 13 with a given controlled variable, whereby servo valve 13 has its opening controlled, with the flow of hydraulic oil from hydraulic source 14 to injection cylinder 2i getting changed so that the forward speed (injection speed) of screw 11 may agree with setpoint Vs of speed. In this case, controlled variable SV for servo valve 13 is calculated according to expression $SV = SVo + E\{1 - e^{-(t/T)}\}/Ts$, where SVo refers to a controlled variable in the preceding injection cycle, E to a deviation of a speed measurement in reference to a setpoint of speed, e to a reference constant for natural logarithms, t to a sampling cycle time, T to a primary delay time constant, and Ts to control time constant.

On the other hand, pressure sensing member 3 detects pressure measurement Pd variable depending on the running conditions of injection cylinder 2i and feeds it to differentiation circuitry 4 wherein pressure measurement Pb is differentiated, with differentiated value Dv provided thereby which is subsequently fed to gain adjusting member 5. Gain adjusting member 5 implements gain adjustment in response to differentiated value Dv, providing correction value Av.

In this case, correction value Av is calculated according to expression $Av = Kp \times Dv = Kp(Pd - Pdr)$ where Kp refers to a differentiation gain, Pd to pressure measurement in the current injection molding cycle, Pdr to pressure measurement characterized only by past injection molding cyclic differentiation. Noting that the coefficient (gain) to be multiplied to differentiated value Dv according to setpoint Vs of speed and pressure measurement Pd is required to be changed, differentiation gain Kp is calculated, following expression $Kp = Kpdv \times Kpp$ where Kpv refers to a differentiation gain dependent upon setpoint Vs of speed, Kpp to another differentiation gain variable with pressure measurement Pd. More precisely in this regard, Kpv is calculated, following expression $Kpv = aVs + b$ or $Kpv = aVs^2 + bVs + c$. Kpp is likewise calculated.

Correction value Av provided by gain adjusting member 5 is fed to correcting member 6 wherein command value VC of speed is corrected according to correction value Av, namely, the correction is done by adding correction value Av to command value Vc of speed. Therefore, total controlled variable SV for servo valve 13 is calculated according to expression $SV = SVo + [E + Kpv \times Kpp \times Kp (Pd - Pdr)] \times [1 - e^{-(t/T)}/TS]$, whereby injection speed goes through not only ordinary feedback control but also experiences a correction in response to the fluctuations of load pressure. Thus, the injection speed (speed measurement Vd) controlled as in the foregoing becomes such as illustrated in a solid line in FIG. 2, and referring to the graph therein, it is understood that the injection speed is assured freedom from falling, nevertheless the load pressure rises abruptly after point Xp, whereby injection speed control can stably be effected with high accuracy.

One preferred embodiment of the present invention has been described in the foregoing, but it should be understood that the present invention is by no means limited only to such an embodiment as the above. In the above-quoted embodiment, though a case of injection cylinder control is exemplified, the present invention may be embodied for such an actuator as a mold clamping cylinder or the like and a servo motor-driven type injection molding machine as well. Further in the preferred embodiment, there is exemplified a case where gain adjustment by the gain adjusting member is implemented through the arithmetic processing according to an operational expression, wherein the arithmetic processing refers to a concept covering the case where the data of conversion is applied which is optionally obtained from a data table in which said data of conversion is stored in advance. Further, the constitutional particulars, the embodiment methodic details, etc. of the present invention may be modified or altered optionally within the spirit and scope of the present invention.

We claim:

1. A speed control unit for an injection molding machine, said speed control unit being devised for injection speed feedback control of an injection screw in response to a deviation of a speed measurement of said screw from a command value of speed, comprising a pressure sensing means to detect a load pressure of said screw, a differentiation circuit to differentiate a pressure measurement obtained from the pressure sensing means, a gain adjusting means to provide a correction value to a deviation detecting means through gain adjustment of a differentiated value of said pressure measurement from the differentiation circuit, a correcting device including said deviation detection means, said deviation detecting means correcting the command value of speed of said screw after the correction value from the gain adjusting means has been provided, and a control member including primary delay integrator coupled to an output of said deviation detecting means.

2. The speed control unit for an injection molding machine as claimed in claim 1, wherein said gain adjusting means provides a correction value according to a product of said differentiated value multiplied by a differentiation gain.

3. The speed control unit for an injection molding machines as claimed in claim 2, wherein said differentiation gain is obtained from a product of a first differentiation gain calculated via arithmetic operation following a setpoint of speed multiplied by a second differentiation gain calculated through arithmetic operation according to a pressure measurement.

4. The speed control unit for an injection molding machine as claimed in claim 1, wherein said correcting devices has a function to add a correction value to said command value of speed of said screw.

5. The speed control unit for an injection molding machine as claimed in claim 2, wherein said correcting device has a function to add a correction value to said command value of speed of said screw.

6. The speed control unit for an injection molding machine as claimed in claim 3, wherein said correcting device has a function to add a correction value to said command value of speed of said screw.

* * * * *